United States Patent
Krishan et al.

(10) Patent No.: US 12,238,523 B2
(45) Date of Patent: Feb. 25, 2025

(54) BUNDLED AUDIT FOR STALE SESSION BINDINGS

(71) Applicant: Oracle International Corporation, Redwood City, CA (US)

(72) Inventors: Rajiv Krishan, Cary, NC (US); Geeta Mohanty, Bangalore (IN); Gaurav Paliwal, Acton, MA (US); David Bedoya, Rumson, NJ (US); Tarek Assali, Boston, MA (US)

(73) Assignee: Oracle International Corporation, Redwood City, CA (US)

( * ) Notice: Subject to any disclaimer, the term of this patent is extended or adjusted under 35 U.S.C. 154(b) by 178 days.

(21) Appl. No.: 18/173,022

(22) Filed: Feb. 22, 2023

(65) Prior Publication Data
US 2024/0284177 A1    Aug. 22, 2024

(51) Int. Cl.
*H04W 12/10*    (2021.01)

(52) U.S. Cl.
CPC .................................. *H04W 12/10* (2013.01)

(58) Field of Classification Search
CPC ............................... H04W 12/10; H04W 4/50
See application file for complete search history.

(56) References Cited

U.S. PATENT DOCUMENTS

| 11,283,883 | B1 * | 3/2022 | Krishan | ................. | H04M 15/44 |
| 2023/0007456 | A1 * | 1/2023 | Krishan | ................. | H04M 15/66 |
| 2024/0284177 | A1 * | 8/2024 | Krishan | ................. | H04W 12/10 |

* cited by examiner

*Primary Examiner* — Ponnoreay Pich

(57) ABSTRACT

Various embodiments of the present technology generally relate to systems and methods for efficiently cleaning up resources within a network by bundling binding session audit requests. A binding support function (BSF) may determine support for bundled audit requests and unbundled audit requests at one or more policy control functions (PCFs) associated with potentially stale session binding records at the BSF. Based on audit support function at the PCF, the BSF may determine whether to bundle audit requests together, issue unbundled audit requests, or not issue any audit requests. PCF support for bundled or unbundled auditing may be provided via a network repository function (NRF), via headers in binding creation or update requests, or both.

20 Claims, 11 Drawing Sheets

| Attribute Name | Data Type | P | Cardinality | Description |
|---|---|---|---|---|
| | | | 5.6.2.2 TS 29.521 | |
| pcfId | NfInstanceId | O | 0..1 | PCF instance identifier |
| pcfSetId | NfSetId | O | 0..1 | The PCF set Id |
| bindLevel | BindingLevel | O | 0..1 | Contains the level of binding |

Bundled request 902

Path: PCF audit URL
Body: <List of bindings to be audited>

```
{
  "request": [
    {
      "resource": <binding resource URL as provided
by BSF in location header>,
      "custom_data": <optional additional data>
    },
    ...
  ]
}
```

Bundled response 904

```
{
  "response": [
    {
      "resource": <binding resource URL>,
    },
    ...
  ]
}
```

Response Code:
204 – No Content
   - When all specified bindings are present at PCF.
200 – OK
   - When partial set of bindings are valid at PCF.
   - Response body has list of bindings present at PCF.
404 – Not Found
   - When none of the provided bindings exist at PCF.

FIG. 9

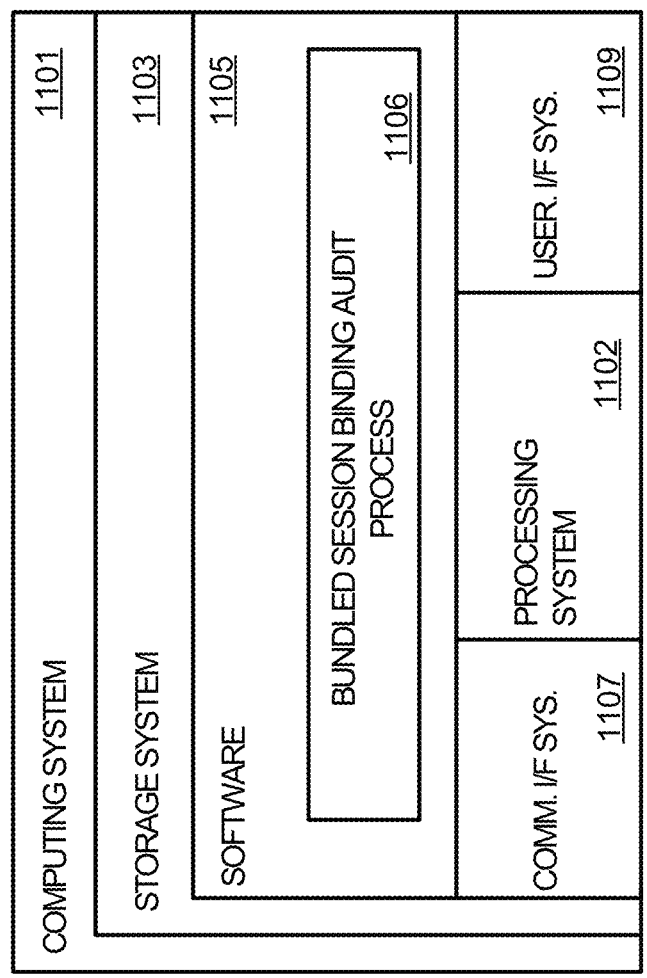
FIG. 11

BUNDLED AUDIT FOR STALE SESSION BINDINGS

TECHNICAL FIELD

Various embodiments of the present technology generally relate to management of resources within a network, such as fifth generation (5G) communications networks. More specifically, embodiments of the present technology relate to systems and methods for improved efficiency in resource cleanup for communication networks.

BACKGROUND

Communications networks can be used to connect remote systems and devices, allowing for distributed and efficient processing, resource use, and intercommunication. Within a network, there may be a variety of resources available for access, each resource available from one or more systems. Specifically, network functions (NFs) serve to provide a resource or functionality to various components and user equipment (UE) used on the wireless network. For example, network functions perform tasks such as session management (e.g., session management function (SMF)), policy control (e.g., policy control function (PCF)), access and mobility (e.g., access and mobility management function (AMF)), and so forth. NFs may register with network repository functions (NRFs) that store information about the NF, including availability and access information (e.g., a network address for a system or component that provides the NF). A network node that provides service may be referred to as a producer NF, while a network node that consumes services may be referred to as a consumer NF. A network function can be both a producer NF and a consumer NF depending on whether it is consuming or providing service.

In some communication network architectures (e.g., third generation partnership project, 3GPP standards), service may be implemented by establishing PDU (packet data unit or protocol data unit) session binding information in a database of a binding support function (BSF) of the network. For example, user equipment (UE) may register with the network, and trigger (e.g., via a session management function, SMF) the creation of a PDU session in order to exchange data with the network. As part of the PDU session creation process, a policy control function (PCF) may be assigned to the session to generate policy rules for the session to control quality of service and charging for the session. The PCF assigned to the session may register with a BSF, and the BSF can create a binding record for the session in its database. NF service consumers seeking to discover the PDU session binding for a UE may do so by querying the BSF using a discovery application programming interface (API) provided by the BSF.

After a binding record becomes inactive or stale, the PCF may send a delete binding record request or other message for deleting the stale binding record from the binding record database of the BSF. If stale binding records are not deleted or cleaned up, resources can be wasted, or other inefficiencies can occur. For example, some error within the network may result in a deletion failing to be successfully transmitted or completed, such as if a PCF suffers a critical failure and loses its own record of active PDU session entries. In some examples, there may be large numbers of stale bindings remaining within a BSF database. Accordingly, there exists a need for processes to detect and address stale session bindings in an efficient manner.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for performing a bundled audit for stale binding sessions. In an embodiment, a binding support function (BSF) system may comprise one or more processors, and a memory having stored thereon instructions. The instructions, upon execution, may cause the one or more processors to determine a first set of potentially stale binding records, associated with a first policy control function (PCF), stored to the BSF, obtain binding record audit support data corresponding to the first PCF, the binding record audit support data indicating whether the first PCF supports receiving a bundled set of binding records in a single audit request, and in response to determining the first PCF supports receiving the bundled set of binding records, issue a bundled audit request including the first set of potentially stale binding records to the first PCF.

In some embodiments, the BSF system may obtain the binding record audit support data from a network function (NF) profile, corresponding to the first PCF, stored at a network repository function (NRF). The BSF system may further obtain an audit uniform resource locator (URL) address corresponding to the first PCF from the NF profile, and issue the bundled audit request to the first PCF via the audit URL. In another embodiment, the BSF system may receive a packet data unit (PDU) session binding request at the BSF from the first PCF, and obtain the binding record audit support data from a header of the PDU session binding request. The BSF system may further obtain a notification uniform resource locator (URL) address corresponding to the first PCF from the header, and issue the bundled audit request to the first PCF via the notification URL. In an example embodiment, the BSF system may obtain set data from the first PCF indicating whether the first PCF is part of a PCF set with a second PCF, determine a second set of potentially stale binding records associated with the second PCF, and in response to determining the first PCF is part of the PCF set, issue the bundled audit request, including the first set of potentially stale binding records and the second set of potentially stale binding records, to the first PCF. The BSF system may further receive a packet data unit (PDU) session binding request at the BSF from the first PCF, the PDU session binding request including a PCF set identifier corresponding to the first PCF, and in response to determining the first PCF is part of the PCF set, determine potentially stale binding records to include in the bundled audit request based on the PCF set identifier. The BSF system may, in response to determining the first PCF is part of the PCF set, set a routing indicator enabling rerouting the bundled audit request to an alternate PCF in the PCF set if the bundled audit request fails to reach the first PCF. In response to determining the first PCF is part of the PCF set, the BSF system may select the first PCF as a target of the bundled audit request based on a preferred locality relative to other PCFs in the PCF set. In some embodiments, the BSF system may, in response to determining the first PCF does not support receiving the bundled set of binding records: determine whether the first PCF supports receiving unbundled audit requests based on the binding record audit support data, in response to determining the first PCF does support receiving unbundled audit requests, issue a plurality of unbundled audit requests corresponding to the first set of potentially stale binding records to the first PCF, and in response to determining the first PCF does not support receiving unbundled audit requests, do not issue an audit request to the first PCF. Further, the BSF system may receive an audit response from the first PCF indicating whether a potentially stale binding record is valid, and remove an invalid binding record from the BSF based on the audit response.

In an alternative embodiment, a method may comprise operating a binding support function (BSF) of a mobile network, including determining a first set of potentially stale binding records, associated with a first policy control function (PCF), stored to the BSF, obtaining binding record audit support data corresponding to the first PCF, the binding record audit support data indicating whether the first PCF supports receiving a bundled set of binding records in a single audit request, and in response to determining the first PCF supports receiving the bundled set of binding records, issuing a bundled audit request including the first set of potentially stale binding records to the first PCF.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 9 is a diagram of example message structure for a system configured to perform a bundled audit for stale session bindings, in accordance with certain embodiments of the present disclosure;

FIG. 11 illustrates a computing system configured to perform a bundled audit for stale session bindings, in accordance with some embodiments of the present technology.

Figure 1:
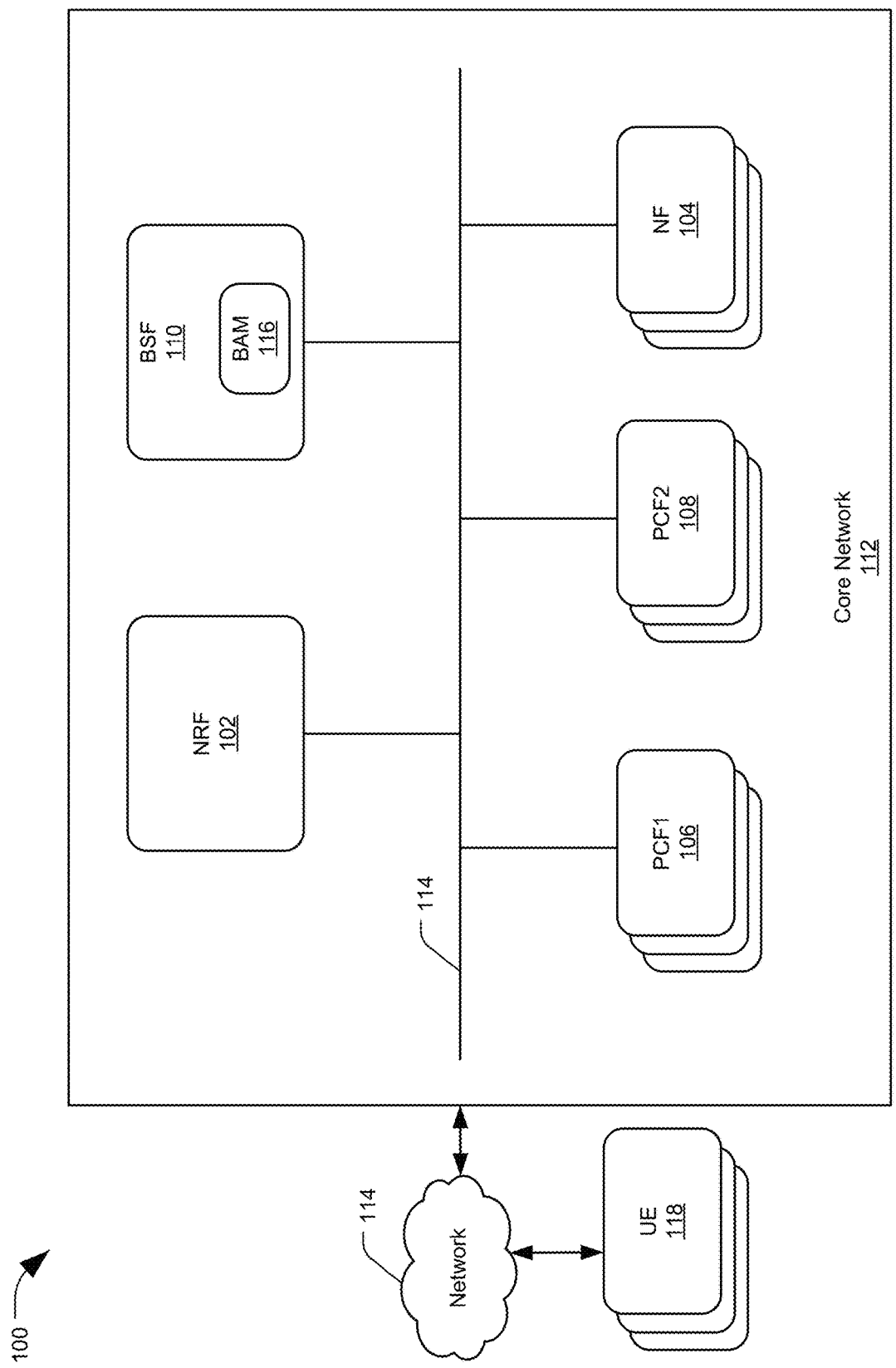
FIG. 1 is a diagram of an operational environment of a system configured to perform a bundled audit for stale session bindings, in accordance with certain embodiments of the present disclosure.

Some components or operations may be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 is a diagram of a system 100 configured to perform a bundled audit for stale session bindings, in accordance with certain embodiments of the present disclosure. The example system 100 may include a 5G mobile network implementing 3GPP (3rd Generation Partnership Project) communication standards (e.g., using the 29.521 technical specification (TS)), although the present disclosure may apply to other communication networks. The system 100 may include one or more UE 118 connected to a core network 112 via network connectivity components 114.

UE 118 may be a device, system, or module that may utilize the resources of the core network 112, such as to establish mobile communications with another UE. UE 118 may include mobile devices such as cell phones, tablets, or modems.

Network connectivity components 114 may comprise components that enable communication over communication links, such as network cards, ports, radio frequency (RF) modules, telecommunications channels, cell towers, processing circuitry and software, or other communication components. Network connectivity components 114 may include metallic, wireless, cellular, or optical links, using various communication formats and protocols. In some examples, network connectivity components 114 may simply be referred to as a "network" by which systems or modules are connected or communicate.

The core network 112 may include the part of a mobile communications network that provides services to UEs 118 through the network connectivity components 114. The core network 112 may include a network repository function or NF repository function (NRF) 102, a plurality of NFs 104, a first set of one or more policy control functions (PCF1) 106, a second set of one or PCFs (PCF2) 108, and a binding support function (BSF) 110. The components of core network 112, such as NRF 102, may have settings or configurations that may be selected or modified via a user interface or terminal (not shown), which may be part of or remote to the core network 112. The components of core network 112, or the physical devices implementing them, may be co-located, remotely distributed, or any combination thereof.

Each or any of UE 118, NRF 102, NF 104, PCF1 106, PCF2 108, BSF 110, and network 114 may be implemented via computers, servers, hardware and software modules, or other system components. The elements of system 100 may include components hosted or situated in the cloud, and implemented as software modules potentially distributed across one or more server devices or other physical components.

Network functions (NFs) 104 may act as functional building blocks of the network infrastructure. Each NF may have a well-defined external interface (e.g., a communications or software interface expecting specified inputs and producing specified outputs) and functional behavior, and may include a network node or module, a physical appliance, or other component. For example, network functions may perform tasks such as session management (e.g., session management function (SMF)), policy control (e.g., policy control function (PCF)), access and mobility (e.g., access and mobility management function (AMF)), data management (e.g., unified data management function (UDM)) and so forth.

A network repository function or NF repository function (NRF) 102 may be a monitoring element which includes and maintains a repository of the NF elements of the network, including what services or resources each provides, and potentially metadata provided by the NF. The NRF 102 may perform both operations to add NFs to the NRF, as well as operations to keep the NRF updated. For example, NFs may register with the NRF to provide registration information and metadata for the NF to the NRF for storing in the repository. Once an NF is registered with the NRF, the NRF may provide information for the NF in response to discovery requests. For example, an NF may send a discovery request to the NRF including search criteria, and the NRF may issue a discovery response providing identifying information and metadata for NFs in the repository matching the search criteria.

A policy control function (PCF) 106 and 108 may be assigned to a protocol data unit (PDU) session created when a UE 118 registers with the core network 112. The PCF 106, 108 may generate policy rules for the session to control quality of service and charging for the session, and may register the session with the binding support function (BSF) 110. The PCF 106, 108 may also register with the NRF 102, and may provide metadata or other information to the NRF 102 identifying capabilities or configuration settings for the PCF 106, 108. A PCF 106, 108 may operate as an individual unit, or as part of a PCF set, where a PDU session may be managed by any available or most convenient PCF from a corresponding PCF set. As shown in system 100, PCF1 106 may correspond to a first individual PCF or PCF set, and PCF2 108 may correspond to a second individual PCF or PCF set.

A binding support function (BSF) 110 may maintain a list, database, or other data structure of binding records describing which PCF 106, 108 is assigned to a PDU session. The BSF 110 may provide the binding support management service (Nbsf_Management service), allowing the BSF to provide protocol data unit (PDU) session binding functionality, which can ensure that an application function (AF) request for a certain PDU session can reach the relevant PCF having the PDU session information. BSF 110 may obtain information about a PCF 106, 108 and its capabilities from the NRF 102, from messages received from the PCF, or a combination thereof. The BSF 110 may create a binding record when a PCF 106, 108 registers a session with BSF 110. NF 104 service consumers seeking to discover the PDU session binding for a UE 118 may do so by querying the BSF 110 using a discovery application programming interface (API) provided by the BSF. The BSF 110 may delete binding records in response to a delete binding record request from a PCF 106, 108.

If the BSF 110 fails to receive a delete request from a PCF 106, 108, it may result in a stale binding record remaining in the BSF database. This may occur, for example, if a delete request is lost in transmission, if the BSF 110 is down when the delete request is sent, or if a critical failure or restart at a PCF 106, 108 results in the PCF losing its own record of active PDU sessions. Systems and methods for performing an audit for stale bindings at the BSF 110 is described in U.S. patent application Ser. No. 17/367,196, entitled "Methods, Systems, and Computer Readable Media for Resource Cleanup in Communications Networks" (the '196 application), the contents of which are incorporated by reference in their entirety. The '196 application described a PCF 106, 108 configured to publish a notification URL and custom data to the BSF 110, via which the BSF can submit an audit to the PCF to validate potentially stale bindings. However, when a PCF 106, 108 restarts cause significant session loss, or a BSF 110 identifies a large number of records to be audited, then auditing each binding record independently can cause network overload, as well as processing overload at BSF and PCF.

Accordingly, BSF 110 may be configured with a bundled audit module (BAM) 116, which may implement a bundled audit process to perform stale session audits in a more efficient manner. Via the BAM 116, a BSF 110 may determine which PCF 106, 108 instances or sets support bundled auditing, whether to issue bundled audit requests to a PCF instance or to a PCF set, a number of audit requests to bundle into a single request, generate the bundled audit requests, or perform other related operations. As audits of stale bindings may not be part of the network architecture (e.g., 3GPP) standard, different PCFs may support different levels of auditing, and exchanging details on audit support may be implemented through customized data exchanges. The implementation of bundled auditing is discussed in regard to FIGS. 2-10.

Figure 2:
FIG. 2 is a table of a system configured to perform a bundled audit for stale session bindings, in accordance with certain embodiments of the present disclosure.

FIG. 2 is a table 200 of a system configured to perform a bundled audit for stale session bindings, in accordance with certain embodiments of the present disclosure. Table 200 may include an example set of information provided to a BSF during registration of a PCF for a PDU session.

Table 200 may depict a set of data fields that may be transmitted to a BSF when registering a PCF for a PDU session binding. The table 200 may correspond to a portion of the data fields identified in section 5.6.2.2 of the 3GPP technical specification (TS) 29.521, although these fields are exemplary, and the invention disclosed herein is not limited thereto. The data provided via the fields of table 200 can be used by the BSF to determine whether the PDU session binding corresponds to an individual PCF instance, or to a PCF set potentially including multiple PCFs. As described in section 4.2.2.2 of 3GPP TS 29.521, "The NF service consumer shall invoke the Nbsf_Management_Register service operation to register the PDU session binding information for a UE in the BSF. The NF service consumer shall send for this an HTTP POST request. . . . The PCF as a NF service consumer may provide PCF Set Id within the 'pcfSetId' attribute and 'bindLevel' attribute set to NF_SET or provide PCF Set Id within the 'pcfSetId' attribute, PCF instance Id within the 'pcfId' attribute and 'bindLevel' attribute set to NF_INSTANCE." Based on this registration operation, the BSF may determine whether to perform bundled auditing for a PCF instance or for a PCF set.

The manner by which a BSF implements bundled auditing and determines bundled auditing support for PCFs may differ depending on whether the components are operating in a system or architecture implementing discovery via an NRF, or a non-discovery model without an NRF. An NRF-based model is discussed in regard to FIGS. 3-5, while a non-NRF model is discussed in regard to FIGS. 6-8.

Figure 3:
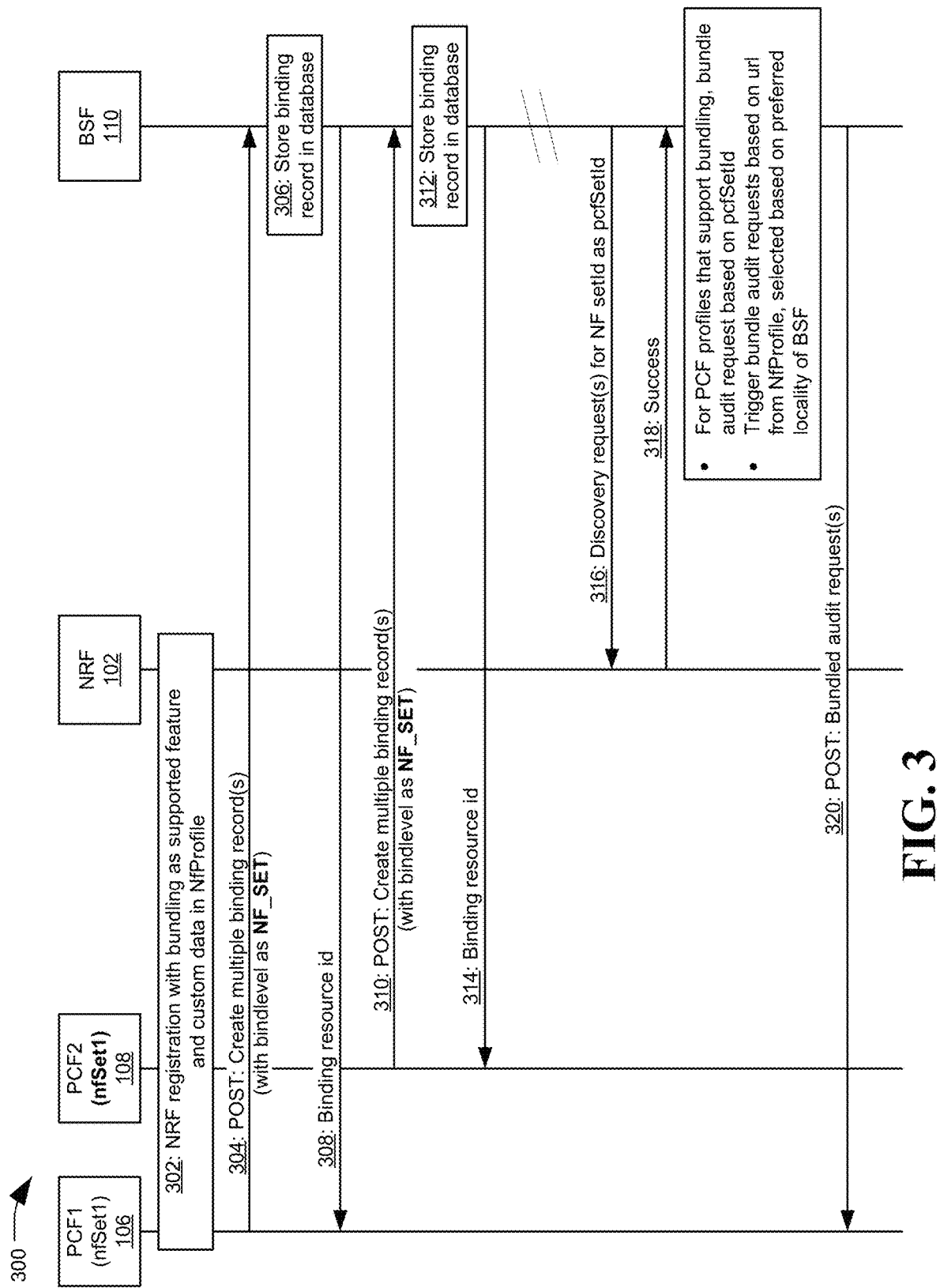
FIG. 3 is a diagram of a system configured to perform a bundled audit for stale session bindings, in accordance with certain embodiments of the present disclosure.

FIG. 3 is a diagram 300 of a system configured to perform a bundled audit for stale session bindings, in accordance with certain embodiments of the present disclosure. In particular, FIG. 3 may illustrate a process flow by which PDU session bindings are created in an NRF-based system for PCFs in a set, and the issuing of bundled audit requests in such a system. The diagram 300 may include a first PCF (PCF1) 106, a second PCF (PCF2) 108, an NRF 102, and a BSF 110. The components of diagram 300 may correspond to the components discussed in regard to FIG. 1. Both PCF1 106 and PCF2 108 may be part of nfSet1.

At 302, PCF1 106 and PCF2 108 may register with NRF 102. In the example of FIG. 3, both PCF1 106 and PCF2 108 may support both binding audits and bundled binding audits. Accordingly, the PCFs may provide custom data for including in their corresponding NF profile (NfProfile) at the NRF 102, indicating their bundled binding audit support. In an example embodiment, the custom data may include providing the values "vendor_binding_audit" and "vendor_bundled_binding_audit" in a supportedVendorSpecificFeatures data field of the NfProfile. The "vendor_binding_audit" feature support indicator from the PCFs indicates an implicit notification to validate any binding session by the BSF 110 with the corresponding PCF. Similarly, the "vendor_bundled_binding_audit" indicator may denote PCF 106, 108 support for handling bundled audit requests. The custom data in the NfProfile can enable a BSF 110 to query the NRF 102 for profiles of PCF1 106 and PCF2 108 to detect their support for binding audits and bundled binding audits. Accordingly, PCFs 106, 108 should allow or enable the BSF 110 to discover the NfProfiles in NRF-based models, for example by setting an "allowedNfTypes" parameter to include BSFs, or by leaving the parameter set to empty.

Similarly, the PCFs 106, 108 may provide parameters and details for the bundled audit support during the NRF registration, for example by including indicators in a "vendor_specific_extension" data field of the NfProfile. An example parameter may include a "vendor_bundled_audit_url" element (e.g., https://pcf1/binding/audit). The URL may be where a PCF 106, 108 is expecting delivery of all bundled audit requests from the BSF 110. Different PCF instances (including PCFs of same or different nfSets), e.g. PCF1 106 and PCF2 108, can register different a "path" in their corresponding bundled_audit_url. Another example parameter may include a "vendor_max_bundle_size" element, which may indicate a maximum number of audit requests that the PCF 106, 018 can support in a single bundle. An operator may configure parameters such as "max_bundle_size" for a PCF 106, 108 based on various factors, such as limiting traffic congestion from multiple audit requests or limiting an audit workload for each bundled audit request on the PCF.

At 304, PCF1 106 may POST one or more PDU session binding requests (PcfBinding) to the BSF 110 to create corresponding binding records. The PcfBinding requests may include a data field "bindLevel" or "bindlevel", which may be set to either NF_SET or NF Instance. The bindLevel value may not indicate whether a corresponding PCF is part of set or not (e.g., nfSet1). Instead, bindLevel may indicate that a corresponding PDU session binding is to a set of PCFs or to an individual PCF instance (that may be part of a set or not). It is possible that a PCF is part of an NfSet with other PCFs, but it publishes certain bindings with bindLevel as NF_SET and other bindings as NF_Instance. For auditing, all records will be grouped based on bindLevel information, and a corresponding PCF for notification or receiving the audit requests may be determined. In the example of FIG. 3, PCF1 106 and PCF2 108 are both part of nfSet1, and may issue PcfBinding requests with a bindLevel of NF_SET.

The binding request may also include a PCF Set Id within the pcfSetId attribute. In response to the binding request, the BSF 110 may store a binding record in the BSF's database, at 306, along with an indicator that PCF1 106 is part of a set rather than an instance. The BSF 110 may return a corresponding binding resource identifier to PCF1 106, at 308. PCF1 106 may use the binding resource ID to track or maintain the corresponding PDU session. However, if the PCF1 106 gets reset and loses its own list of binding resource IDs, or if a delete binding record request between PCF1 and BSF 110 fails, then the binding record at the BSF 110 may become stale.

Similarly, PCF2 108 may POST one or more PDU session binding requests to the BSF 110, with bindLevel set to NF_SET and a PCF Set Id provided, to create corresponding binding records, at 310. At 312 the BSF 110 may store a binding record in the database, and may return a binding resource identifier to PCF2 108, at 314. Once again, the binding records at the BSF 110 may become stale if those records fail to be deleted or removed.

For bindings where the PCF 106, 108 specified the bindLevel attribute in PcfBinding set to NF_SET, the BSF 110 may query the NRF 102 to discover PCF profile(s) for a given NF set, based on the pcfSetId value from the PcfBinding, at 316. The BSF 110 can use a subscription/notification model to limit the impact of discovery with NRF 102. The BSF 110 may issue the discovery request based on determining that a binding audit should be performed, or even if no binding audit is planned. The NRF 102 may respond with the requested profile information, at 318. The profile information may include the binding audit support and bundled binding audit support details provided from the PCFs 106, 108 during the NRF registration at 302.

When the BSF 110 makes a determination that a binding audit should be performed, the BSF may select a PCF profile (from among the PCFs in nfSet1) based on a preferred locality or any other factors. The audit requests may be sent based on the URL from the NfProfile of the PCF selected based on the BSF's 110 preferred locality or other factors. As described in section 4.4.3 of 3GPP TS 29.501, a callback uniform resource identifier (URI) structure shall include absolute URI, including an authority. An nfSet may all share a notification URL in the form of a "path" portion of a callback URI, while the "authority" portion may be different for each PCF, enabling targeting of a specific PCF within an nfSet. When a bundled audit request contains the authority of a target PCF, a service controller proxy or service communications proxy (SCP) may deliver that request to the corresponding PCF instance.

For PCF profiles that support bundling (e.g., when the PCF profile has "vendor_bundled_binding_audit" feature in supportedVendorSpecificFeatures), the BSF 110 may bundle audit requests based on the nfSet indicated in pcfSetId. For example, the BSF 110 may bundle together audits for binding records from both PCF1 106 and PCF2 108 into a single bundled audit request, since both PCFs are part of nfSet1. The BSF 110 may set the maximum amount of bundled audit requests as the minimum of a default "max_bundle_size" setting of the BSF, and the "vendor_max_bundle_size" from the selected NfProfile. If no "vendor_max_bundle_size" is specified in the NfProfile, the default "max bundle size" value may be used.

The bundled audit request may be delivered to the vendor_bundled_audit_url from the selected NfProfile, at 320. In the example of diagram 300, the selected preferred PCF for receiving the bundled audit request may be PCF1 106. Because the PCFs 106, 108 are both part of the same NF set, the BSF 110 may set a routing indicator, such as setting the "3gpp_Sbi_Routing_binding" header to the NfSet level with the set value from pcfSetId. This header setting can allow an SCP to reroute the message to an alternate PCF in a set, if the message fails to reach the original target PCF.

In an example embodiment where PCF1 106 and PCF2 108 only support binding audits, but not bundled binding audits, this would be reflected in their corresponding NfProfiles at the NRF 102. In this case, the BSF 110 may send unbundled audit requests instead of bundled audit requests, at 320. The unbundled audit requests for both PCF1 106 and PCF2 108 may still be sent to a single preferred PCF within NF Set 1. If PCF1 106 and PCF2 108 do not support binding audits at all, the BSF 110 may not send audit requests. An example embodiment of bundling audits for individual PCF instances is discussed in regard to FIG. 4.

Figure 4:
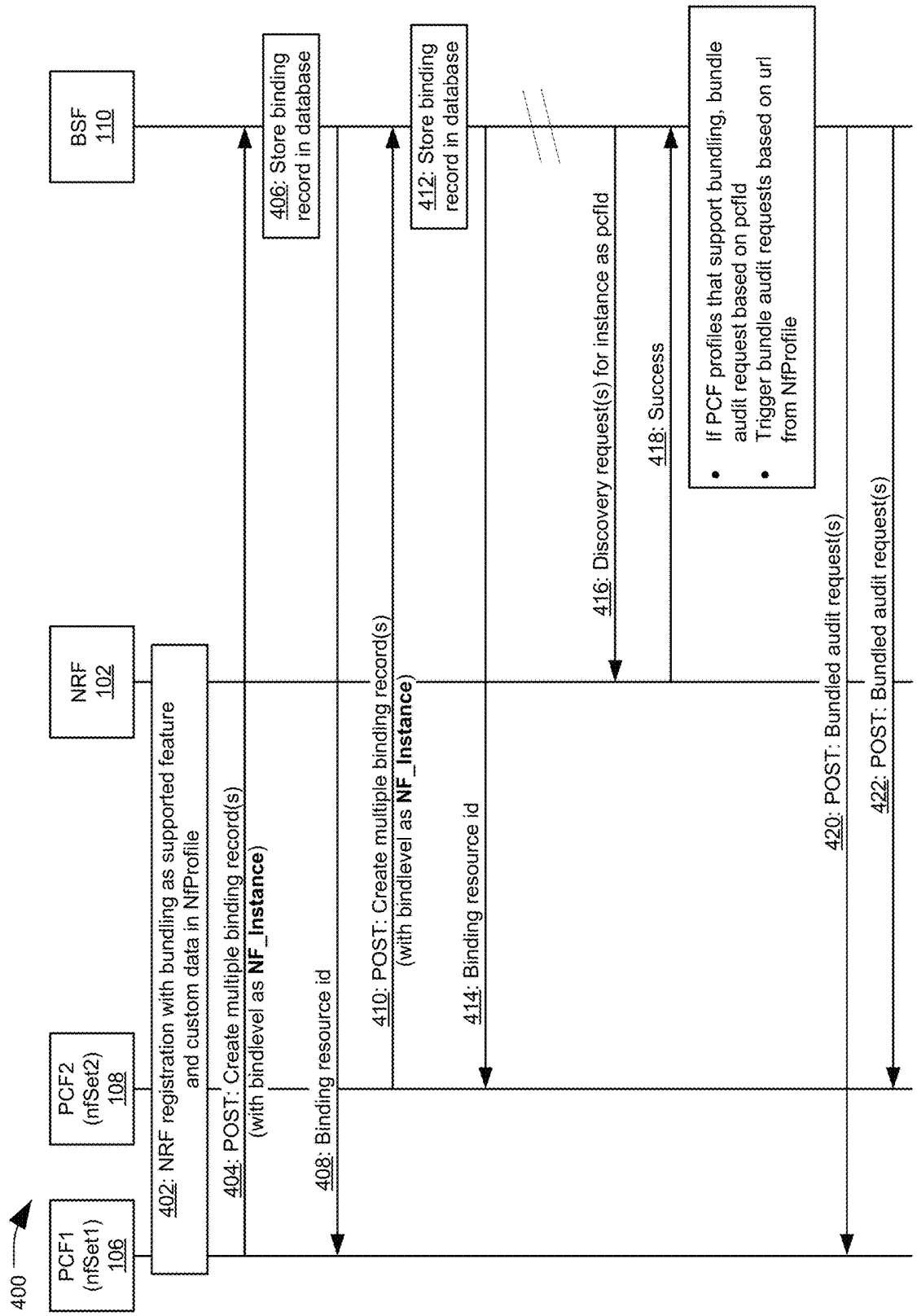
FIG. 4 is a diagram of a system configured to perform a bundled audit for stale session bindings, in accordance with certain embodiments of the present disclosure.

FIG. 4 is a diagram 400 of a system configured to perform a bundled audit for stale session bindings, in accordance with certain embodiments of the present disclosure. In particular, FIG. 4 may illustrate a process flow by which PDU session bindings are created in an NRF-based system for PCF instances, and the issuing of bundled audit requests in such a system. The diagram 400 may include a first PCF (PCF1) 106, a second PCF (PCF2) 108, an NRF 102, and a BSF 110. The components of diagram 400 may correspond to the components discussed in regard to FIG. 1. PCF1 106 may be part of nfSet1, while PCF2 108 may be part of nfSet2, and both may issue binding requests with a bindLevel of NF_Instance. In some embodiments, it should be noted that both PCF1 106 and PCF2 108 may be in the same nfSet (e.g., nfSet1), but still treated as individual instances, as explained further below.

At 402, PCF1 106 and PCF2 108 may register with NRF 102. In the example of FIG. 4, both PCF1 106 and PCF2 108 may support both binding audits and bundled binding audits. Accordingly, the PCFs may provide custom data for including in their corresponding NF profile (NfProfile) at the NRF 102, indicating their bundled binding audit support, as discussed in regard to FIG. 3. Similarly, the PCFs 106, 108 may provide parameters and details for the bundled audit support during the NRF registration, also as discussed in regard to FIG. 3.

At 404, PCF1 106 may POST one or more PDU session binding requests (PcfBinding) to the BSF 110 to create corresponding binding records. The binding request may include a data field bindLevel set to "NF_Instance," indicating that audit requests for the binding should not be bundled with audit requests for bindings from other PCFs. The binding request may also include a PCF instance identifier within the pcfId attribute. In some examples, the PCF1 106 may be an individual instance because it does share an nfSet with another PCF, such as in the depicted example of FIG. 4 where PCF1 106 is in nfSet1, while PCF2 108 is in nfSet2. However, in other embodiments PCF1 106 can be part of a same nfSet with one or more other PCFs (e.g. if both PCF1 106 and PCF2 108 were in nfSet1), but based on some selected or preferred operator's logic, PCF1 can still publish binding requests to the BSF 110 with bindLevel set to NF_Instance. With bindLevel set to NF_Instance, the BSF 110 may not bundle requests for PCF1 and PCF2 together, and instead may bundle requests to a respective PCF only, even if they share the same nfSet.

In response to the binding request, the BSF 110 may store a binding record in the BSF's database, at 406, along with an indicator that PCF1 106 is an instance rather than part of a set. The BSF 110 may return a corresponding binding resource identifier to PCF1 106, at 408. Similarly, PCF2 108 may POST one or more PDU session binding requests to the BSF 110, with bindLevel set to NF_Instance and a PCF instance Id provided, to create corresponding binding records, at 410. At 412 the BSF 110 may store a binding record in the database, and may return a binding resource identifier to PCF2 108, at 414.

For bindings where the PCF 106, 108 specified the bindLevel attribute in PcfBinding set to NF_Instance, the BSF 110 may query the NRF 102 to discover a PCF profile for a given NF instance, based on the pcfId value from the PcfBinding, at 416. The NRF 102 may respond with the requested profile information, at 418. The profile information may include the binding audit support and bundled binding audit support details provided from the PCFs 106, 108 during the NRF registration at 402.

When the BSF 110 makes a determination that a binding audit should be performed, the BSF may select a PCF profile corresponding to stale binding records in the BSF's database. An audit request may be sent based on the URL from the NfProfile of the selected PCF. For PCF profiles that support bundling (e.g., when the PCF profile has "vendor_bundled_binding_audit" feature in supportedVendorSpecificFeatures), the BSF 110 may bundle audit requests of stale binding records corresponding to the selected PCF 106, 108. The BSF 110 may set the maximum amount of bundled audit requests as the minimum of a default "max_ bundle_size" setting of the BSF, and the "vendor_max_bundle_size" from the selected NfProfile.

The bundled audit request may be delivered to the vendor_bundled_audit_url from the NfProfile of the selected PCF. In the example of diagram 400, the bundled audit requests corresponding to PCF1 106 may be sent at 420, and bundled audit requests corresponding to PCF2 108 may be sent at 422. An example process flow in which the PCF instances do not support bundled audits is described in regard to FIG. 5.

Figure 5:
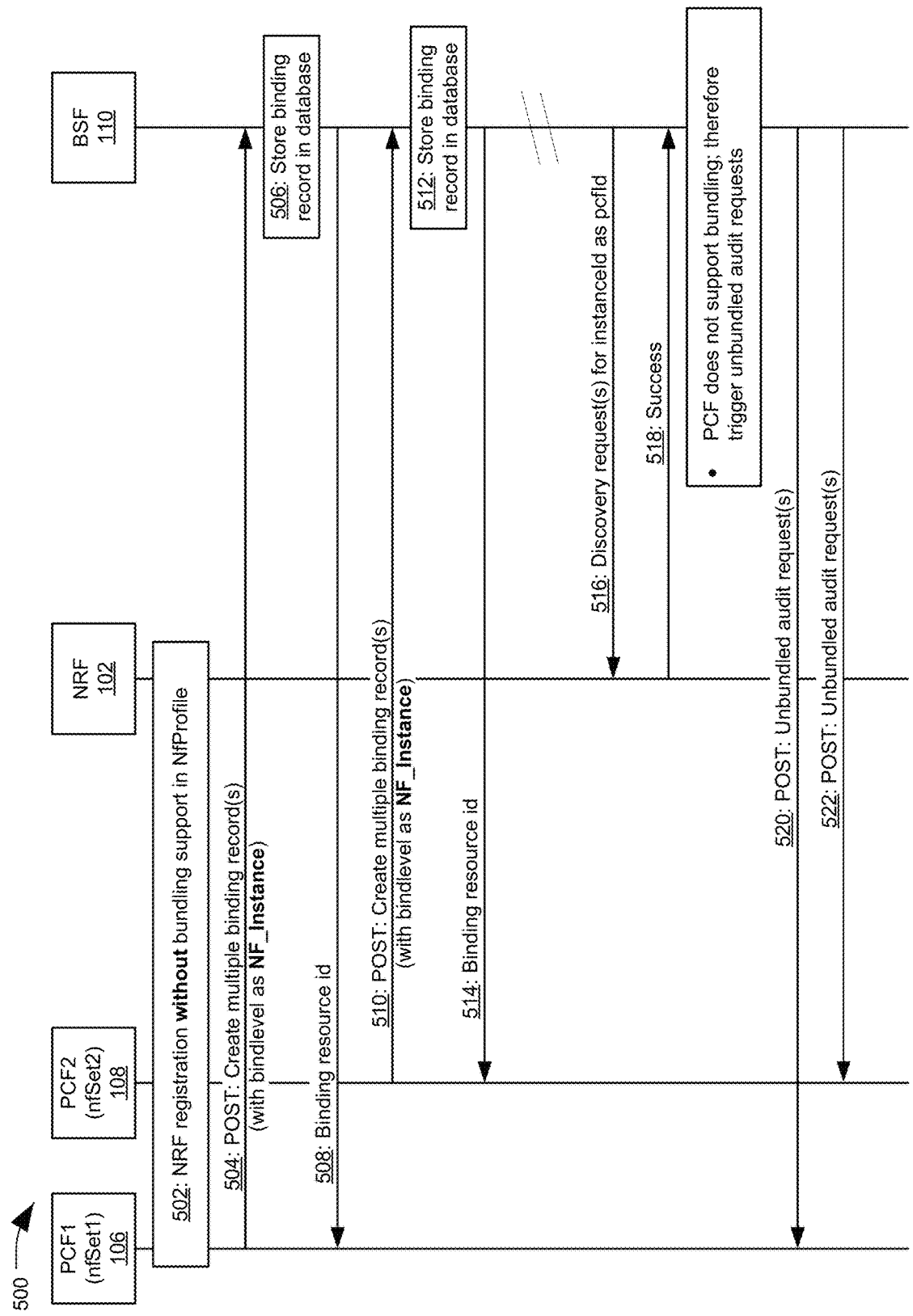
FIG. 5 is a diagram of a system configured to perform a bundled audit for stale session bindings, in accordance with certain embodiments of the present disclosure.

FIG. 5 is a diagram 500 of a system configured to perform a bundled audit for stale session bindings, in accordance with certain embodiments of the present disclosure. In particular, FIG. 5 may illustrate a process flow by which PDU session bindings are created in an NRF-based system for PCF instances, and the issuing of unbundled audit requests in such a system. The diagram 500 may include a first PCF (PCF1) 106, a second PCF (PCF2) 108, an NRF 102, and a BSF 110. The components of diagram 500 may correspond to the components discussed in regard to FIG. 1. PCF1 106 may be part of nfSet1, while PCF2 108 may be part of nfSet2, and both may issue binding requests with a bindLevel of NF_Instance.

At 502, PCF1 106 and PCF2 108 may register with NRF 102. In the example of FIG. 5, both PCF1 106 and PCF2 108 may support binding audits, but not support bundled binding audits. Accordingly, the PCFs may provide custom data for including in their corresponding NF profile (NfProfile) at the NRF 102, indicating their support of binding audits, but not bundled binding audits. Similarly, the PCFs 106, 108 may provide parameters and details for the binding audit support during the NRF registration, but no parameters for bundled audit-specific operations. The operations of creating and storing binding records in 504, 506, 508, 510, 512, and 514 may proceed as described in regard to 404-414 of FIG. 4.

At 516, the BSF 110 may query the NRF 102 to discover a PCF profile for a given NF instance, based on the pcfId value from the PcfBinding. The NRF 102 may respond with the requested profile information, at 518. The profile information may include the binding audit support, but may not include any indicators that bundled binding audit is supported by the PCFs 106, 108. Based on the NfProfile information, the BSF 110 may determine that bundled audits are not appropriate for PCF1 106 and PCF2 108, and that unbundled audit requests should be used instead.

When the BSF 110 makes a determination that a binding audit should be performed, the BSF may select a PCF profile corresponding to stale binding records in the BSF's database. A binding audit request may be sent based on the URL from the NfProfile of the selected PCF. In the example embodiment of FIG. 5, where PCF1 106 and PCF2 108 only support binding audits, but not bundled binding audits, this would be reflected in their corresponding NfProfiles at the NRF 102. In this case, the BSF 110 may send unbundled audit requests instead of bundled audit requests.

The unbundled audit request may be delivered to the vendor_bundled_audit_url from the NfProfile of the selected PCF. In the example of diagram 500, the unbundled audit requests corresponding to PCF1 106 may be sent at 520, and the unbundled audit requests corresponding to PCF2 108 may be sent at 522. In an alternate embodiment where the NfProfile information for PCF1 106 and PCF2 108 did not indicate support of binding audits at all, the BSF 110 may determine that no audit requests should be sent. An example process flow for performing audits in a system without NRFs is described in regard to FIG. 6.

Figure 6:
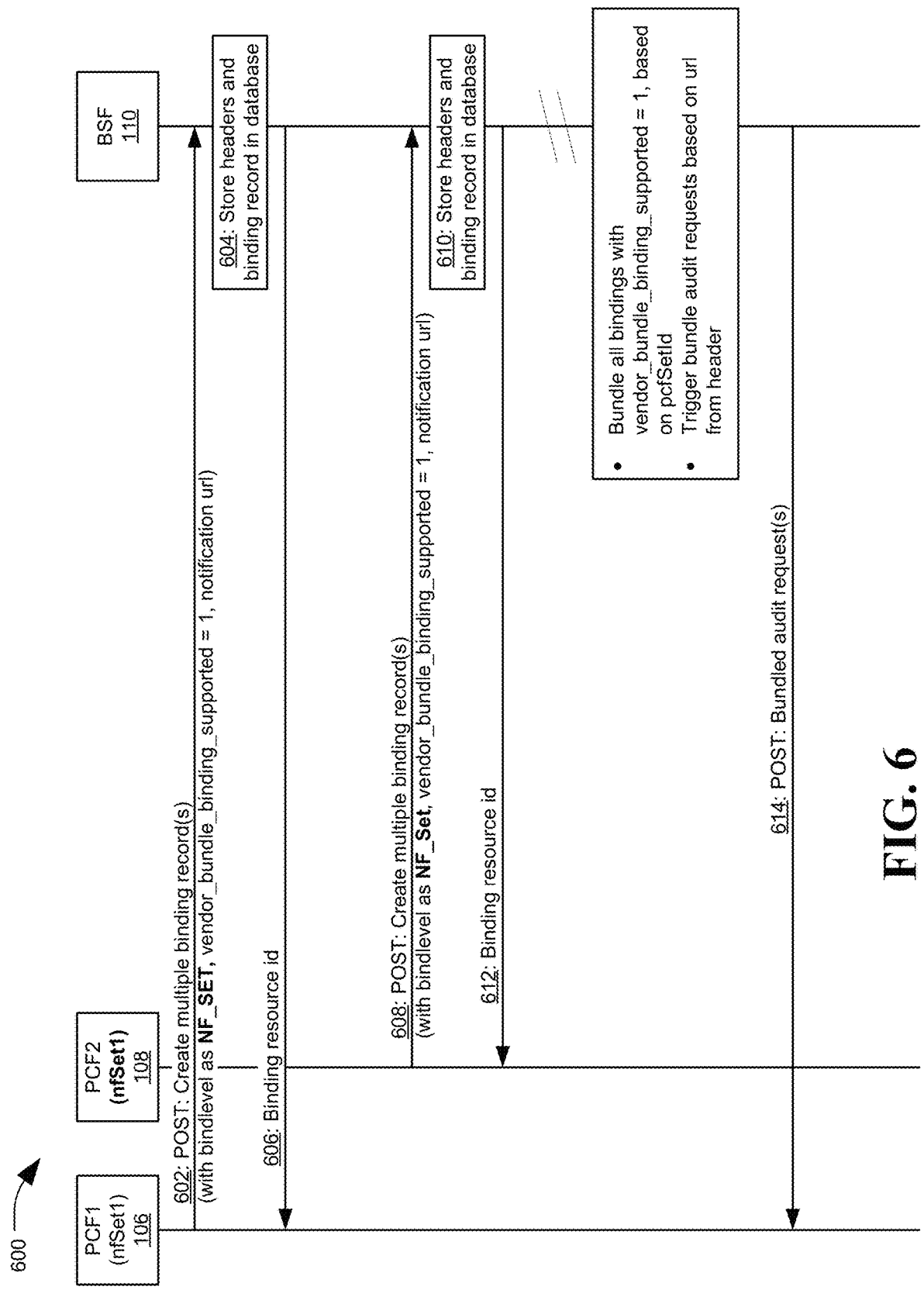
FIG. 6 is a diagram of a system configured to perform a bundled audit for stale session bindings, in accordance with certain embodiments of the present disclosure.

FIG. 6 is a diagram 600 of a system configured to perform a bundled audit for stale session bindings, in accordance with certain embodiments of the present disclosure. In particular, FIG. 6 may illustrate a process flow by which PDU session bindings are created in a non-discovery model that does not include an NRF, and the issuing of bundled audit requests in such a system. The diagram 600 may include a first PCF (PCF1) 106, a second PCF (PCF2) 108, and a BSF 110. The components of diagram 600 may correspond to the components discussed in regard to FIG. 1. Both PCF1 106 and PCF2 108 may be part of nfSet1.

At 602, PCF1 106 may POST one or more PDU session binding requests (PcfBinding) to the BSF 110 to create corresponding binding records. Because PCF1 106 and PCF2 108 are both part of nfSet1, the binding request may include a data field bindLevel set to "NF_SET," indicating that the binding is tied to nfSet1 rather than an individual PCF instance. The binding request may also include a PCF Set Id within the pcfSetId attribute. Further, as there may be no NRF in the system at which PCF1 106 can provide details about binding audit support and bundled binding audit support, certain audit support details may be included with the binding request message. As part of a create or update binding request, the PCF1 106 may publish indicators in the message header, such as a "vendor_bundle_binding_supported" custom header set to 1, to indicate that binding record audits can be bundled by the BSF 110. The PCF1 106 may also include a notification URL as custom data with each binding request (e.g., as discussed in the '196 application incorporated herein). Bindings with a bindLevel set to NF_Set from PCFs sharing an nfSet (whether in NRF discovery models or not) may all provide a same notification URL. Bindings with a bindLevel set to NF_Instance from different PCFs may provide different notification URLs (even if they are both in a same nfSet). In some examples, the PCF1 106 may not provide a "vendor_max_bundle_size" supported by PCF1, and instead the BSF 110 may use a default "max_bundle_size" when bundling binding audit requests.

In response to the binding request, the BSF 110 may store a binding record, along with the binding request header and its binding audit support details, and an indicator that PCF1 106 is part of a set, in the BSF's database, at 604. As the bundled binding support details are provided along with binding requests (rather than in an NfProfile for PCF1 106), the bundled binding audit support may be tracked by individual bindings at the BSF 110. Alternately, the BSF 110 may associate bundled binding audit support with each PCF, based on the header details from binding requests from the corresponding PCF. The BSF 110 may return a corresponding binding resource identifier to PCF1 106, at 606.

Similarly, PCF2 108 may POST one or more PDU session binding requests to the BSF 110, with bindLevel set to NF_SET and a PCF Set Id provided, to create corresponding binding records, at 608. The PCF2 108 may include bundled binding support details and audit URL along with the biding request, as described in regard to PCF1 106 in step 602. At 610 the BSF 110 may store a binding record, the binding request header, and the audit URL in the database, and may return a binding resource identifier to PCF2 108, at 612.

When the BSF 110 makes a determination that a binding audit should be performed, the BSF may determine bundled audit operations based on data from the PcfBinding requests for each stale binding record. For bindings where the PCF 106, 108 specified the bindLevel attribute in PcfBinding set to NF_SET, the BSF 110 may bundle all binding audit requests for which vendor_bundle_binding_supported=1, based on the pcfSetId attribute from the corresponding binding requests. Accordingly, since both PCF1 106 and PCF2 108 posted bindings with bindLevel as NF_SET and the same value for pcfSetId (e.g., nfSet1), and vendor_bundle_binding_supported=1, audit requests for stale bindings from both PCFs may be bundled together. The number of bundled records may be based on a default max bundle size setting at the BSF 110.

The BSF 110 may select a PCF in nfSet1 to issue the bundled audit requests to. In some examples, a preferred locality may not be known to the BSF 110 without access to an NfProfile of the PCF from an NRF, but in such non-discovery models, the BSF may choose a target PCF based on custom logic, e.g. selecting a PCF instance with a largest number of registration requests in the bundled audit, or selecting a PCF associated with a first or last event added to the bundled request. The audit requests may be sent based on the notification URL from the header of a binding request from the selected PCF. In the example of diagram 600, the selected preferred PCF for receiving the bundled audit request may be PCF1 106. Because the PCFs 106, 108 are both part of the same NF set, the BSF 110 may set the "3gpp-Sbi-Routing-binding" header to the NfSet level with the set value from pcfSetId, to enable re-routing among PCFs in the set. The bundled audit requests may be sent to PCF1 106, at 614.

In an example embodiment where PCF1 106 and PCF2 108 only support binding audits, but not bundled binding audits, this may be reflected in the custom data provided in the binding request header. In such a case, the BSF 110 may send unbundled audit requests instead of bundled audit requests, at 614. The unbundled audit requests for both PCF1 106 and PCF2 108 may still be sent to a single preferred PCF within NF Set 1. If PCF1 106 and PCF2 108 do not support binding audits at all (e.g., as may be indicated by the lack of any audit support information in the binding requests), the BSF 110 may not send audit requests. An example embodiment of bundling audits for individual PCF instances in a system without NRFs is discussed in regard to FIG. 7.

Figure 7:
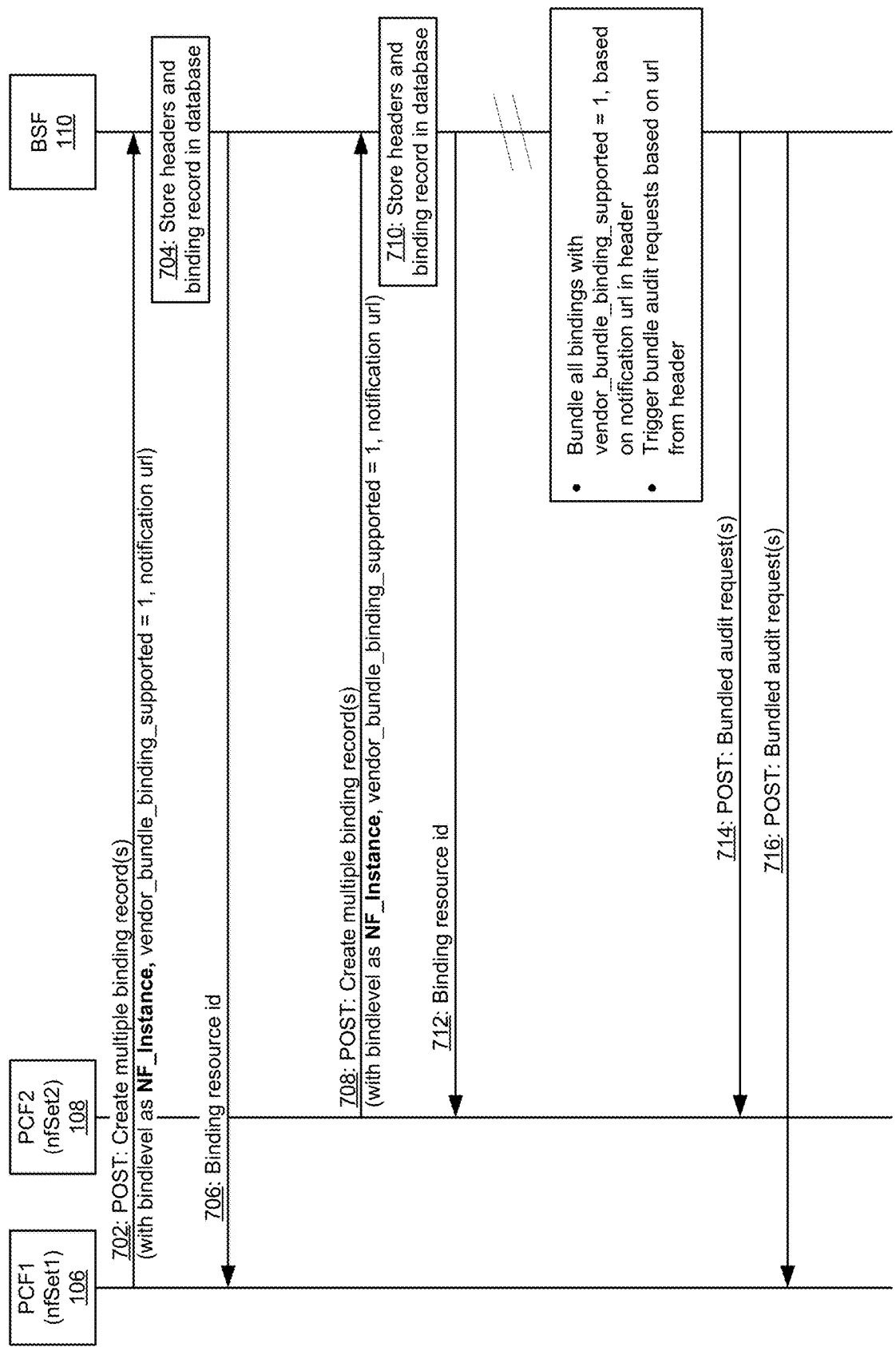
FIG. 7 is a diagram of a system configured to perform a bundled audit for stale session bindings, in accordance with certain embodiments of the present disclosure.

FIG. 7 is a diagram 700 of a system configured to perform a bundled audit for stale session bindings, in accordance with certain embodiments of the present disclosure. In particular, FIG. 7 may illustrate a process flow by which PDU session bindings are created in a non-discovery model that does not include an NRF, and the issuing of bundled audit requests in such a system. The diagram 700 may include a first PCF (PCF1) 106, a second PCF (PCF2) 108, and a BSF 110. The components of diagram 700 may correspond to the components discussed in regard to FIG. 1. In the depicted example of FIG. 7, PCF1 106 may be part of nfSet1, while PCF2 108 may be part of nfSet2, and both may issue binding requests as individual PCF instances (although both PCF1 106 and PCF2 108 may specify a bindLevel set to NF_Instance and still be part of a same nfSet, as described previously).

The operations of creating and storing binding records in 702, 704, 706, 708, 710, and 712 may proceed as described in regard to 602-612 of FIG. 6. However, instead of providing a bindLevel set at NF_SET, PCF1 106 and PCF2 108 may instead provide a bindLevel set to NF_Instance, indicating that audit requests for the bindings should only be bundled with other bindings from a same PCF, rather than being bundled with other bindings from a PCF set.

When the BSF 110 makes a determination that a binding audit should be performed, the BSF may determine bundled audit operations based on data from the PcfBinding requests for each stale binding record. For bindings where the PCF 106, 108 specified the bindLevel attribute in PcfBinding as NF_Instance, or when the bindLevel is not specified, the BSF 110 may bundle all binding audit requests for which vendor_bundle_binding_supported=1, based on the notification URL provided with the binding create or update request. As each PCF specifying a bindLevel of NF_Instance should provide a unique URL, the notification URL may be used to group related stale binding records for auditing. The number of bundled records may be based on a default max_bundle_size setting at the BSF 110. A first bundled audit request may be delivered to the notification URL for PCF2 108 at 714, and a second bundled audit request may be delivered to the notification URL for PCF1 106 at 716. An example process flow in which the PCF instances do not support bundled audits is described in regard to FIG. 8.

Figure 8:
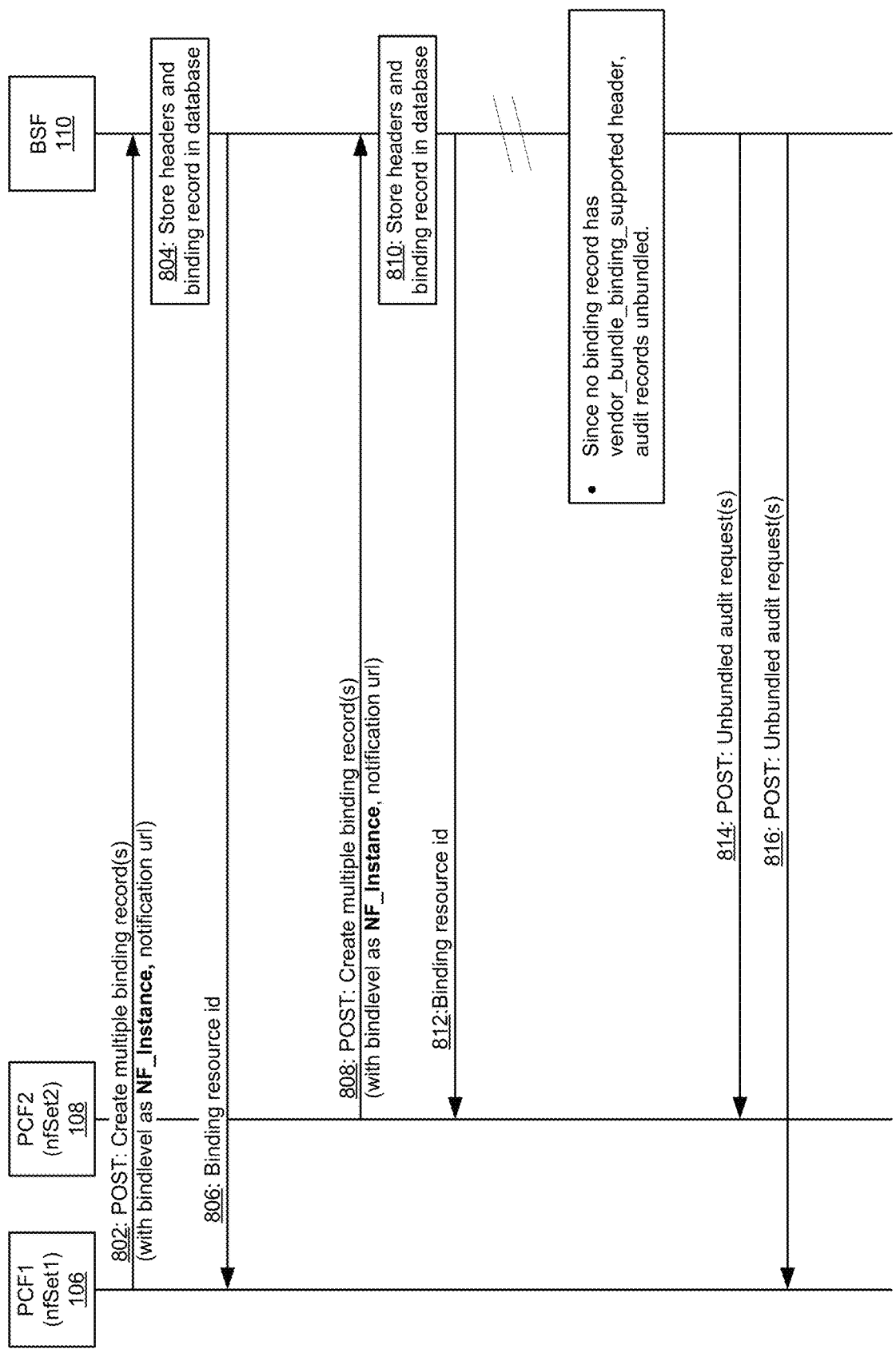
FIG. 8 is a diagram of a system configured to perform a bundled audit for stale session bindings, in accordance with certain embodiments of the present disclosure.

FIG. 8 is a diagram 800 of a system configured to perform a bundled audit for stale session bindings, in accordance with certain embodiments of the present disclosure. In particular, FIG. 8 may illustrate a process flow by which PDU session bindings are created in a non-discovery model that does not include an NRF, and the issuing of unbundled audit requests in such a system. The diagram 800 may include a first PCF (PCF1) 106, a second PCF (PCF2) 108, and a BSF 110. The components of diagram 800 may correspond to the components discussed in regard to FIG. 1. In the depicted example, PCF1 106 may be part of nfSet1, while PCF2 108 may be part of nfSet2, and both may publish binding requests with a bindLevel of NF_Instance.

The operations of creating and storing binding records in 802, 804, 806, 808, 810, and 812 may proceed as described in regard to 702-712 of FIG. 7. However, instead of providing custom data indicating "vendor_bundle_binding_supported"=1 in a header of the binding create or update requests, at 802 and 808, the requests may include "vendor_bundle_binding_supported"=0, or no "vendor_bundle_binding_supported" custom data at all. Based on the lack of bundle binding support indicated by the binding requests, the BSF 110 may determine that PCF1 106 and PCF2 108 do not support bundled audit requests. However, the binding requests at 802 and 808 may still indicate that PCF1 106 and PCF2 108 support unbundled binding audits, for example based on an inclusion of notification URLs or "vendor_binding_audit" custom data in the header of the binding requests, or through other indicators.

When the BSF 110 makes a determination that a binding audit should be performed, the BSF may determine bundled audit operations based on data from the PcfBinding requests for each stale binding record. In the example of diagram 800, the binding records for bindings associated with PCF 106, 108 may indicate that audits are supported (e.g., based on the notification URL), but that bundled audit requests are not supported (e.g., based on the absence of "vendor_bundle_binding_supported"=1 in the binding request header). Further, the binding requests may indicate that PCF 106, 108 are individual NF instances, rather than being part of an NF set with other PCFs, based on the bindLevel attribute set to NF_Instance. Accordingly, the BSF 110 may issue unbundled audit requests to the corresponding notification URL in the binding record. A first set of one or more unbundled audit requests may be delivered to the notification URL for PCF2 108 at 814, and a second set of one or more unbundled audit requests may be delivered to the notification URL for PCF1 106 at 816. In an example embodiment where PCF 106, 108 did not support binding audits at all (e.g., if no notification URL was provided in the binding request, or the PCFs otherwise indicated a lack of binding audit support), then the BSF 110 may not issue binding audits at 814 or 816.

There may be operational limitations for the example embodiments described herein. For example, for the routing of audit requests among PCFs in an NF Set, each PCF may enable "vendor_binding_audit" and "vendor_bundled_binding_audit" in their NF profiles only when all PCF instances in a set support bundled auditing requests. Similarly, each PCF may publish "vendor_bundle_binding_supported" and a same "notification URL" in binding requests only when all PCF instances in a set support bundled auditing requests. These limitations may correspond to the use of indirect routing, when a BSF 110 sets a "3gpp-Sbi-Routing-Binding" header to nfSet in binding audit requests, to enable SCP to perform alternate routing of audit notification request (bundled or un-bundled) to any PCF instances in a set. Therefore, any PCF in the set should be configured to handle the audits or bundling, in case that PCF ends up receiving the audit requests.

Since the execution of binding audits, and bundled binding audits, may be based upon indicators or support published by PCF instances (e.g., in NF profiles at an NRF, or when creating or updating binding records), an operator for a PCF can choose to disable or enable auditing for selected PCF instances. Similarly, the number of binding records to be bundled in an audit may be controlled through PCF support, or through configurable default setting at a BSF. Thus, based on PCF testing and benchmarking results, an operator for a PCF can define the maximum number of audit records that a BSF shall bundle in a bundled object. Further, since audits between BSF and PCF may be based on notification, there may be no impact on Oauth requirements. The NRF-based discovery models (e.g., such as described in regard to FIGS. 3-5) may work for 3gpp-defined routing models deployments "B," "C," and "D," while non-discovery models should work for all 3gpp routing models (e.g., "A" through "D").

Turning now to FIG. 9, a diagram 900 of example message structure for a system configured to perform a bundled audit for stale session bindings is depicted, in accordance with certain embodiments of the present disclosure. In particular, FIG. 9 may illustrate example structures for a bundled binding audit request 902 and a bundled audit response 904. The bundled request 902 may be sent from BSF 110 to a PCF 106, 108, and the bundled response 904 may be returned from the PCF 106, 108 to the BSF 110, as depicted in FIG. 1.

When a BSF 110 determines that a bundled binding audit should be performed, the BSF may generate a bundled request 902. The path for the bundled request 902 may be set as described in regard to FIGS. 3-8 (e.g., based on a bundled audit URL or notification URL from an NF profile or binding request of a PCF). Additionally, the BSF may generate the bundled request 902 with a "3gpp-Sbi-Routing-Binding" attribute set to NF Set in the header, to enable indirect routing to any PCF in a set of PCFs.

The body of the bundled request 902 may be populated with a list of bindings to be audited at the PCF. The bundled request 902 may include a "request" field including one or more bindings (e.g., up to a maximum specified by the PCF or a setting of the BSF). Each binding my include one or more fields or data objects, such as "resource" and "custom_data" fields. The resource field may include a binding resource URL as provided by the BSF in a location header. In particular, when a PCF sends a create binding request to the BSF, in response the BSF may provide a response code and location header. The "location" header can provide information for resources which the PCF can use later to update or delete that binding. The location header may function like a pointer to an object created and stored in the BSF. Based on the resource information received in the location header, a PCF can tell the BSF which object to update or delete. Meanwhile, the custom_data field(s) may include various information about a binding, and may include a cookie object or other data, as discussed in regard to the '196 application.

The PCF may use the bindings in the request to perform an audit of the bindings in its own records. The PCF can compare the bindings from the bundled request 902 to the bindings in its own records to identify which of the audited bindings, if any, are still valid, or are not found and are invalid. The PCF may also use the information from the request to contact relevant NFs associated with the bindings to determine a status of those bindings, in case binding records were lost at the PCF. Based on the audit performed at the PCF, the PCF may generate a bundled response 904 to return to the BSF.

In particular, upon receipt of a bundled request 902, the PCF may iterate through each record in the "request" parameter of the bundled request. If all bindings resources in the request are present at the PCF, then the bundled response 904 may be generated with a response code (e.g., code "204—No Content"), without the need for any other body content. Response code "204—No Content" may indicate to the BSF that all the audited records are still at the PCF and are valid. If a partial set of binding resources in the request are preset at the PCF, then the bundled response 904 may be generated with a response code (e.g., code "200—OK"), along with a list of the binding records that are present at the PCF and valid (or in an alternate embodiment, the binding records that are not present in the PCF and are invalid). Response code "200—OK" may indicate to the BSF that some records are stale or invalid and should be cleaned up. The BSF may find the intersection of resource URLs sent in the bundled request 902 vs the resource URLs received in the response 904, with all missing resource URLs being invalid and eligible for cleaning (or with the missing URLs being valid, and the listed URLs being invalid, depending on implementation). If none of the specified binding resources are available at the PCF, then the bundled response 904 may be generated with a response code (e.g., code "404—Not Found"), without the need for any other body content. Response code "404—Not Found" may indicate that none of the binding resources are at the PCF, and therefore are all invalid and can be removed from the BSF database. The specific response codes used above are exemplary and any response codes may be used to correspond to the relevant indication without departing from the scope of this application. An example method for performing bundled audits is described in regard to FIG. 10.

Figure 10:
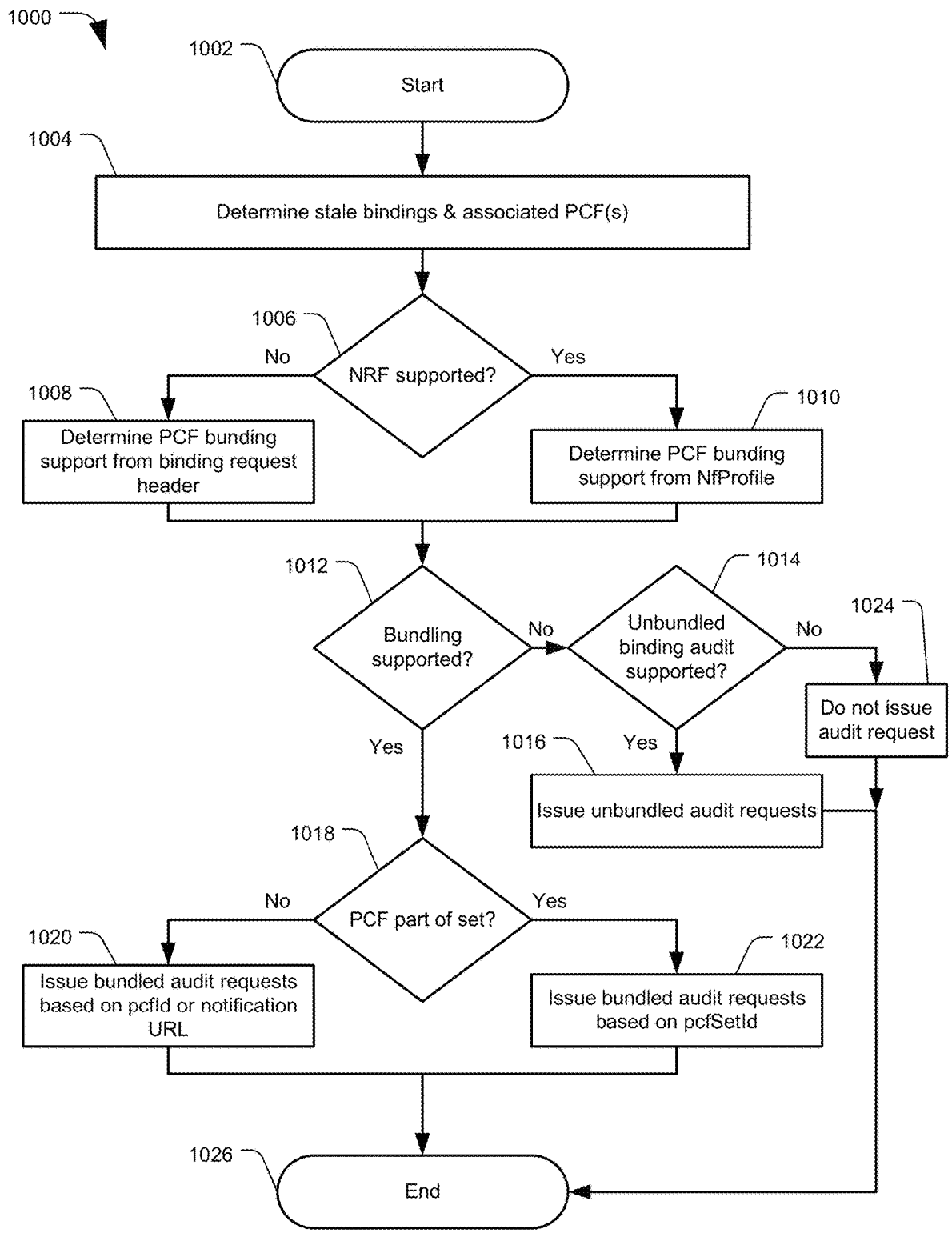
FIG. 10 depicts a flowchart of an example method to perform a bundled audit for stale session bindings, in accordance with certain embodiments of the present disclosure.

FIG. 10 depicts a flowchart 1000 of an example method to perform a bundled audit for stale session bindings, in accordance with certain embodiments of the present disclosure. In particular, the method of FIG. 10 depicts an example process for determining whether a PCF associated with a stale binding can support bundled audits, unbundled audits, or no audits, and issuing audit requests based on the determination. The method may be performed by devices and systems described herein, such as the BSF 110 or associated BAM 116 of FIG. 1.

The method may start at 1002, and then may include determining stale binding record(s) and associated PCF(s), at 1004. For example, the BSF may access a binding records database or repository of the BSF, and identify potentially stale binding records (e.g., based on the binding record not being accessed or updated for some selected period of time). Each potentially stale binding record may have an associated PCF included as part of or along with the binding record at the BSF.

The method may include determining whether NRF is supported, at 1006. For example, the communication system or model itself my include or not include NRF support, or PCFs or the BSF may support or not support NRF. A BSF may determine whether NRF is supported based on whether information on a PCF is registered with an NRF. When NRF is supported, a PCF may perform a registration process with an NRF, resulting in an NfProfile for the PCF. The PCF can provide custom data during registration that can be included in an NfProfile, and provide an indication of whether the PCF supports bundled binding audits, unbundled binding audits, or neither. If NRF is not supported, the PCF may provide indicators of audit support via other means, such as through custom header details provided to a BSF during a binding record creation or update request. Accordingly, when NRF is not supported, the method may include determining PCF bundling support from binding request headers or other messaging between the PCF and BSF, at 1008. When NRF is supported, the method may include determining PCF bundling support from details in the NfProfile, at 1010. In some examples, the communication network itself, the BSF, or even the PCF may include or support NRF, but a PCF may still provide audit support information via binding requests, which may result in proceeding via 1008. For example, a PCF may register information with an NRF to generate an NfProfile, but include audit support information through binding request headers. In that case, the BSF may not need to look up the NfProfile information, and can proceed using the information from the binding request headers alone.

Based on the bundling support information for the PCF determined from the binding record header or NfProfile, the method may include determining whether the PCF supports bundled binding audits, at 1012.

If bundling is not supported, the method may include determining whether unbundled binding audits are supported at the PCF, at 1014. Support for unbundled binding audits may be determined based on similar information sources as the bundled audit support, e.g., via binding request headers or NfProfile details. If unbundled binding audits are not supported, then the method may include not issuing an audit request for potentially stale binding records associated with the PCF, at 1024, and ending the process, at 1026. If unbundled binding audits are supported, the method may include issuing unbundled audit requests for potentially stale binding records associated with the PCF, at 1016, and ending the process, at 1026.

If bundled audit requests are supported by the PCF, at 1012, the method may include determining whether stale bindings are associated with a PCF set, as opposed to a PCF instance, at 1018. The determination may be made based on a bindLevel attribute provided by the PCF during binding creation or update requests to the BSF. A bindLevel of NF_SET may indicate a binding is associated with a set of PCFs capable of handling bundled audits, while a bindLevel of NF_Instance may indicate the binding is associated with an individual PCF.

If the is not associated with a PCF set, the method may include bundling audit requests based on the pcfId for the PCF (e.g., in embodiments supporting NfProfile at an NRF) or based on a notification URL associated with the PCF (e.g., in embodiments where NRF is not supported a notification URL may be included in a header of a binding create or update request), at 1020. Only records associated with the PCF in question may be bundled together.

If the binding is associated with a PCF set, at 1018, the method may include bundling audit requests based on a pcfSetId for the set of PCFs, at 1022. Each PCF in the set of PCFs may have a same pcfSetId, and therefore potentially stale binding records for every PCF in the same set may be bundled and transmitted together. The BSF may issue the bundled audit request to a PCF based on a preferred locality, a first binding record in a bundle, oldest or most recent binding records in a bundle, or other factors. The BSF may add a "3gpp-Sbi-Routing-Binding" element to a header, enabling an SCP to perform alternate routing to any PCF in the set.

The number of records bundled together may be specified by the PCF (e.g., via the NfProfile), or may be set based on a configurable default maximum bundled record setting of the BSF. After issuing the bundled audit request(s), the method may end, at 1026. A computing system configured to perform the operations of the methods of FIGS. 3-10 is described in regard to FIG. 11.

FIG. 11 illustrates an apparatus 1100 including a computing system 1101 that is representative of any system or collection of systems in which the various processes, systems, programs, services, and scenarios disclosed herein may be implemented. For example, computing system 1101 may be an example of BSF 110 or BAM 116 of FIG. 1. Examples of computing system 1101 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 1101 may be implemented as a single apparatus, system, or device or may be implemented in a distributed manner as multiple apparatuses, systems, or devices. Computing system 1101 may include, but is not limited to, processing system 1102, storage system 1103, software 1105, communication interface system 1107, and user interface system 1109. Processing system 1102 may be operatively coupled with storage system 1103, communication interface system 1107, and user interface system 1109.

Processing system 1102 may load and execute software 1105 from storage system 1103. Software 1105 may include and implement bundled session binding audit process 1106, which may be representative of any of the operations for determining bundled audit support, unbundled audit support, and implementing binding session audits discussed with respect to the preceding figures. When executed by processing system 1102 to determine and implement a binding audit operation, software 1105 may direct processing system 1102 to operate as described herein for at least the various processes, operational scenarios, and sequences discussed in the foregoing implementations. Computing system 1101 may optionally include additional devices, features, or functionality not discussed for purposes of brevity.

In some embodiments, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 may include general purpose central processing units, graphical processing units, application specific processors, and logic devices, as well as any other type of processing device, combinations, or variations thereof.

Storage system 1103 may comprise any memory device or computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including bundled session binding audit process 1006 among other functions) may be implemented in program instructions that may, when executed by processing system 1102, direct processing system 1102 to operate as described with respect to the various operational scenarios, sequences, and processes illustrated herein. For example, software 1105 may include program instructions for determining PCF support of binding audits and bundled binding audits, including audit path URLs and maximum bundled audit requests supported, in both NRF-based discovery models and non-discovery models, generating audit requests based on the PCF feature support, and processing audit request responses as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to implement a bundled binding audit process as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

While some examples provided herein are described in the context of 5G communication networks operated in a cloud environment, it should be understood the systems and methods described herein for bundled session binding audits are not limited to such embodiments, and may apply to a variety of other communication networks and resource discovery request environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A binding support function (BSF) system, comprising:
   one or more processors; and
   a memory having stored thereon instructions that, upon execution by the one or more processors, cause the one or more processors to:
   determine a first set of potentially stale binding records, associated with a first policy control function (PCF), stored to the BSF;
   obtain binding record audit support data corresponding to the first PCF, the binding record audit support data indicating whether the first PCF supports receiving a bundled set of binding records in a single audit request; and
   in response to determining the first PCF supports receiving the bundled set of binding records, issue a bundled audit request including the first set of potentially stale binding records to the first PCF.

2. The BSF system of claim 1, wherein the instructions comprise further instructions that, upon execution by the one or more processors, cause the one or more processors to:
   obtain the binding record audit support data from a network function (NF) profile, corresponding to the first PCF, stored at a network repository function (NRF).

3. The BSF system of claim 2, wherein the instructions comprise further instructions that, upon execution by the one or more processors, cause the one or more processors to:
   obtain an audit uniform resource locator (URL) address corresponding to the first PCF from the NF profile; and
   issue the bundled audit request to the first PCF via the audit URL.

4. The BSF system of claim 1, wherein the instructions comprise further instructions that, upon execution by the one or more processors, cause the one or more processors to:
   receive a packet data unit (PDU) session binding request at the BSF from the first PCF; and
   obtain the binding record audit support data from a header of the PDU session binding request.

5. The BSF system of claim 4, wherein the instructions comprise further instructions that, upon execution by the one or more processors, cause the one or more processors to:
   obtain a notification uniform resource locator (URL) address corresponding to the first PCF from the header; and
   issue the bundled audit request to the first PCF via the notification URL.

6. The BSF system of claim 1, wherein the instructions comprise further instructions that, upon execution by the one or more processors, cause the one or more processors to:
   obtain set data from the first PCF indicating whether the first PCF is part of a PCF set with a second PCF;

determine a second set of potentially stale binding records associated with the second PCF; and in response to determining the first PCF is part of the PCF set, issue the bundled audit request, including the first set of potentially stale binding records and the second set of potentially stale binding records, to the first PCF.

7. The BSF system of claim 6, wherein the instructions comprise further instructions that, upon execution by the one or more processors, cause the one or more processors to:

receive a packet data unit (PDU) session binding request at the BSF from the first PCF, the PDU session binding request including a PCF set identifier corresponding to the first PCF; and in response to determining the first PCF is part of the PCF set, determine potentially stale binding records to include in the bundled audit request based on the PCF set identifier.

8. The BSF system of claim 6, wherein the instructions comprise further instructions that, upon execution by the one or more processors, cause the one or more processors to:

in response to determining the first PCF is part of the PCF set, set a routing indicator enabling rerouting the bundled audit request to an alternate PCF in the PCF set if the bundled audit request fails to reach the first PCF.

9. The BSF system of claim 6, wherein the instructions comprise further instructions that, upon execution by the one or more processors, cause the one or more processors to:

in response to determining the first PCF is part of the PCF set, select the first PCF as a target of the bundled audit request based on a preferred locality relative to other PCFs in the PCF set.

10. The BSF system of claim 1, wherein the instructions comprise further instructions that, upon execution by the one or more processors, cause the one or more processors to:

in response to determining the first PCF does not support receiving the bundled set of binding records:

determine whether the first PCF supports receiving unbundled audit requests based on the binding record audit support data;

in response to determining the first PCF does support receiving unbundled audit requests, issue a plurality of unbundled audit requests corresponding to the first set of potentially stale binding records to the first PCF;

in response to determining the first PCF does not support receiving unbundled audit requests, do not issue an audit request to the first PCF;

receive an audit response from the first PCF indicating whether a potentially stale binding record is valid; and remove an invalid binding record from the BSF based on the audit response.

11. A method comprising:

operating a binding support function (BSF) of a mobile network, including:

determining a first set of potentially stale binding records, associated with a first policy control function (PCF), stored to the BSF;

obtaining binding record audit support data corresponding to the first PCF, the binding record audit support data indicating whether the first PCF supports receiving a bundled set of binding records in a single audit request; and in response to determining the first PCF supports receiving the bundled set of binding records, issuing a bundled audit request including the first set of potentially stale binding records to the first PCF.

12. The method of claim 11 further comprising:

obtaining the binding record audit support data from a network function (NF) profile, corresponding to the first PCF, stored at a network repository function (NRF).

13. The method of claim 12 further comprising:

obtaining an audit uniform resource locator (URL) address corresponding to the first PCF from the NF profile; and issuing the bundled audit request to the first PCF via the audit URL.

14. The method of claim 11 further comprising:

receiving a packet data unit (PDU) session binding request at the BSF from the first PCF; and obtaining the binding record audit support data from a header of the PDU session binding request.

15. The method of claim 14 further comprising:

obtaining a notification uniform resource locator (URL) address corresponding to the first PCF from the header; and issuing the bundled audit request to the first PCF via the notification URL.

16. The method of claim 11 further comprising:

obtaining set data from the first PCF indicating whether the first PCF is part of a PCF set with a second PCF;

determining a second set of potentially stale binding records associated with the second PCF; and in response to determining the first PCF is part of the PCF set, issuing the bundled audit request, including the first set of potentially stale binding records and the second set of potentially stale binding records, to the first PCF.

17. The method of claim 16 further comprising:

receiving a packet data unit (PDU) session binding request at the BSF from the first PCF, the PDU session binding request including a PCF set identifier corresponding to the first PCF; and in response to determining the first PCF is part of the PCF set, determining potentially stale binding records to include in the bundled audit request based on the PCF set identifier.

18. The method of claim 16 further comprising:

in response to determining the first PCF is part of the PCF set, setting a routing indicator enabling rerouting the bundled audit request to an alternate PCF in the PCF set if the bundled audit request fails to reach the first PCF.

19. The method of claim 16 further comprising:

in response to determining the first PCF is part of the PCF set, selecting the first PCF as a target of the bundled audit request based on a preferred locality relative to other PCFs in the PCF set.

20. The method of claim 11 further comprising:

in response to determining the first PCF does not support receiving the bundled set of binding records:

determining whether the first PCF supports receiving unbundled audit requests based on the binding record audit support data;

in response to determining the first PCF does support receiving unbundled audit requests, issuing a plurality of unbundled audit requests corresponding to the first set of potentially stale binding records to the first PCF;

in response to determining the first PCF does not support receiving unbundled audit requests, not issuing an audit request to the first PCF;

receiving an audit response from the first PCF indicating whether a potentially stale binding record is valid; and removing an invalid binding record from the BSF based on the audit response.

\* \* \* \* \*

UNITED STATES PATENT AND TRADEMARK OFFICE
CERTIFICATE OF CORRECTION

| | | |
|---|---|---|
| PATENT NO. | : 12,238,523 B2 | Page 1 of 1 |
| APPLICATION NO. | : 18/173022 | |
| DATED | : February 25, 2025 | |
| INVENTOR(S) | : Krishan et al. | |

It is certified that error appears in the above-identified patent and that said Letters Patent is hereby corrected as shown below:

On the Title Page

In Column 7, Lines 57-58, item (56) delete ""vendor bundled_binding_audit"" and insert -- "vendor_bundled_binding_audit" --, therefor.

In the Specifications

In Column 8, Line 29, delete "NF Instance." and insert -- NF_Instance. --, therefor.

In Column 9, Line 36, delete ""max bundle size"" and insert -- "max_bundle_size" --, therefor.

In Column 13, Lines 7-8, delete "max bundle size" and insert -- max_bundle_size --, therefor.

Signed and Sealed this
Third Day of June, 2025

Coke Morgan Stewart
*Acting Director of the United States Patent and Trademark Office*